United States Patent [19]

Marmol

[11] 4,213,661
[45] Jul. 22, 1980

[54] BEARING SUPPORT STRUCTURE COMBINING FLUID DAMPING AND SPRING DAMPING APPARATUS

[75] Inventor: Ronald A. Marmol, Palm Beach Gardens, Fla.

[73] Assignee: United Technologies Corporation, Hartford, Conn.

[21] Appl. No.: 904,089

[22] Filed: May 8, 1978

[51] Int. Cl.² ............................................. F16C 27/00
[52] U.S. Cl. .................................. 308/184 R; 308/26
[58] Field of Search ........................ 308/184 R, 15, 26

[56] References Cited
U.S. PATENT DOCUMENTS

| | | | |
|---|---|---|---|
| 2,403,489 | 7/1946 | Birmann | 308/26 |
| 2,576,141 | 11/1951 | Pike | 308/26 |
| 2,631,901 | 3/1953 | Holben et al. | 308/184 R |

FOREIGN PATENT DOCUMENTS 22815 of 1913 United Kingdom ...................... 308/26

Primary Examiner—Charles E. Frankfort
Attorney, Agent, or Firm—Robert C. Walker

[57] ABSTRACT

A bearing support structure capable of reliable operation in a rotary machine is disclosed. Various construction details which enable the damping of vibratory energy are discussed. Fluid damping and spring damping apparatus are combined in forming an effective structure for damping synchronous and non-synchronous vibratory energy. The system is built around a plurality of arcuate beams which effect spring damping, and which collaterally form chambers for the containment of a fluid damping medium.

5 Claims, 4 Drawing Figures

BEARING SUPPORT STRUCTURE COMBINING FLUID DAMPING AND SPRING DAMPING APPARATUS

The Government has rights in this invention pursuant to Contract No. DAAJ02-76-C-0011 awarded by the Department of the Army.

BACKGROUND OF THE INVENTION

1. Field of the Invention

This invention relates to bearings of the type utilized in rotary machinery, and more specifically to oil damped bearings incorporated spring stabilizers.

2. Description of the Prior Art

In many types of rotary machines, rotors mounted therein experience vibration of high amplitude. Such vibration causes large forces to be transmitted across the bearings between the rotor and the machine housing. If left unchecked, higher than normal stresses in the bearings are generated and premature failure of the bearings results.

Vibration may be caused by both synchronous and non-synchronous stimuli. Synchronous stimuli are associated with unbalanced weight on the rotor as may result in the manufacture or assembly of components, or which may occur through internal damage during operation of the machine. Non-synchronous excitation is a self-exciting phenomenon resulting from variable loadings on the rotor. Such variable loading frequently occurs in fluid film bearings, or may result from varied aerodynamic loading on one or more of rotor members.

One effective means for damping excitation in rotors is known as film damping. In film damping an incompressible fluid such as oil is flowed in an annulus around the outside of the bearing. The bearing is free to move orbitally about the annulus. The orbital motion of the bearing in the damping fluid generates a hydrodynamic pressure which resists further displacement. Shearing of the fluid occurs and, in a well designed system, effective damping of vibration results.

Oil damped bearings have been known in industry for some time. One early showing in 1952 which will be useful in understanding the concepts disclosed herein, is set forth in U.S. Pat. No. 2,602,009 to Barlow et al entitled, "Bearing Mounting". In Barlow et al a plurality of chambers are formed between an inner sleeve and an outer sleeve which is spaced radially from the inner sleeve. Each chamber is in communication with adjacent chambers and is filled with a viscous fluid. Should the shaft supported by the bearing tend to move orbitally, the respective volumes of the chambers begins to vary. Oil is caused to flow between adjacent chambers and orbital movements of the shaft become damped.

Since the early development of film dampers, improved support structures combining spring damping with the film damping have been developed and used. In such apparatus, the inner ring of a film damper is cantilevered from a ridged support structure. One typical illustration of such a construction is shown in NASA Technical Note NASA TN D-7892 by Cunningham et al entitled "Design of an Oil Squeeze Film Damper Bearing for a Multimass Flexible-Rotor Bearing System". Other similar structures are shown in U.S. Pat. No. 4,046,430 to Buono et al entitled "Damped Inner Shaft Bearing and Stabilizer"; U.S. Pat. No. 3,979,155 to Sood et al entitled "Flexible Damped Bearing Support"; U.S. Pat. No. 3,994,541 to Geary et al entitled "Bearing Assembly"; and U.S. Pat. No. 4,027,931 to Streifert entitled "Flexible Damped Bearing Support".

Notwithstanding the advanced state of the damper art as represented by the above publication, scientists and engineers involved in the design of rotary machinery continue to search for structures having yet improved damping qualities or reduced physical size.

SUMMARY OF THE INVENTION

A primary aim of the present invention is to provide an effective structure for supporting bearings in a rotary machine. A simplified and compact configuration capable of damping vibratory energy is sought, and specific objects are to reduce the weight of the damping structure while controlling the restraining forces which need be transmitted across the bearings.

According to the present invention, spring damping and film damping are combined in a compact bearing support structure in which a plurality of arcuate springs are disposed in end to end relationship between an inner housing and an outer housing and wherein each spring is adapted to form a chamber between the spring and the outer housing for fluid damping.

A primary feature of the present invention is the arcuate springs separating the inner housing from the outer housing. A recessed portion in the outer face of each spring forms a chamber for damping fluid. A center pedestal spaces each spring from the outer surface of the inner housing. The ends of each chamber are closed by outwardly extending pedestals which abut the inner surface of the outer housing. Fluid is flowable to the chambers through at least one inlet conduit in the outer housing. In one embodiment a groove in the inner surface of the outer housing extends over the end pedestals to provide fluid communication between the chambers.

A principle advantage of the present invention is the ability of the combined spring damping and fluid damping to dissipate vibratory energy. A compact structure is enabled by wrapping the spring damper around the bearing. Tuning the supported rotor to a natural frequency outside the normal operating range of the machine in which the rotor is installed, is enabled in some embodiments by varying the stiffness of the arcuate springs. A lightweight structure capable of manufacture at reduced cost from conventional designs is a further advantage.

The foregoing, and other objects, features and advantages of the present invention will become more apparent in the light of the following detailed description of the preferred embodiment thereof as shown in the accompanying drawing.

DETAILED DESCRIPTION

Figure 1:
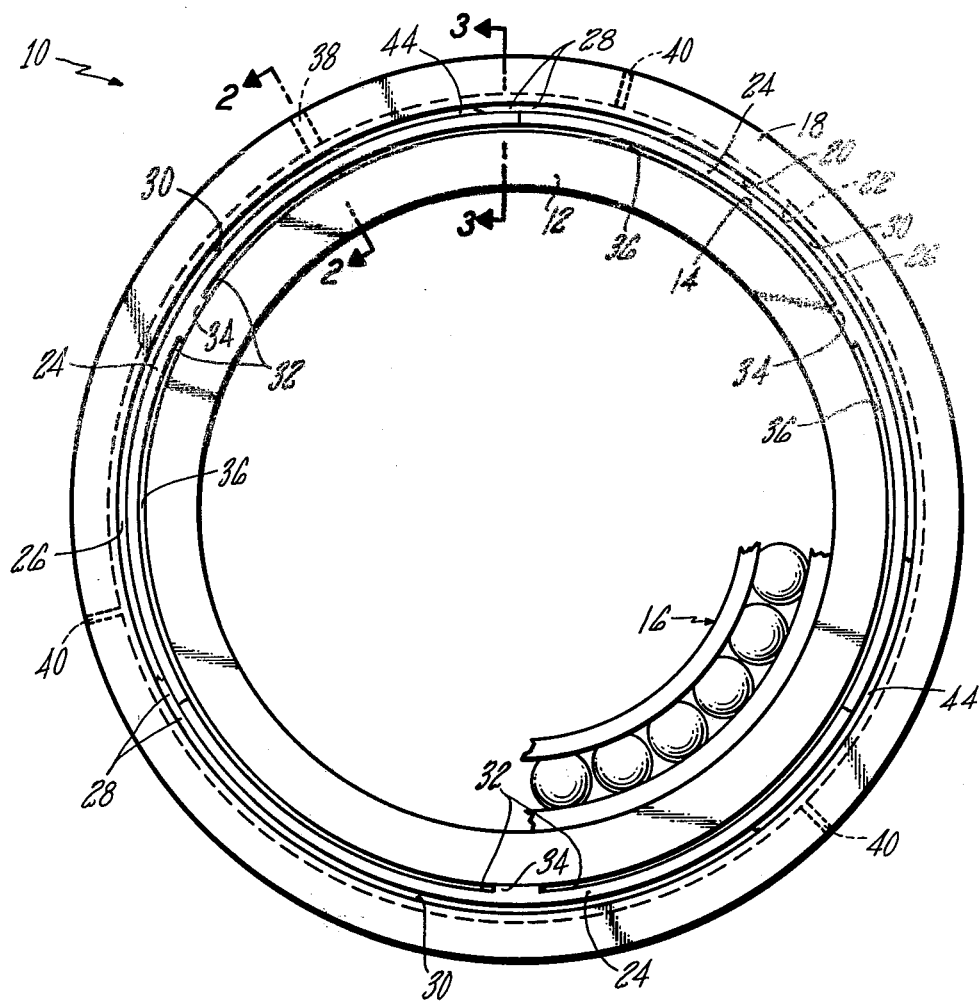
FIG. 1 is a perspective view of the bearing support structure including cutaway portions which reveal the contour of the arcuate segments.
Figure 3:
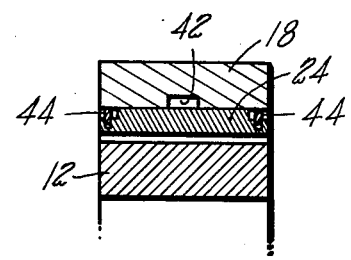
FIG. 3 is a sectional view taken along line 3—3 of FIG. 1.

A bearing support structure 10 is illustrated in FIG. 1. The structure is formed of an inner housing 12 having an outwardly facing surface 14. The inner housing is adapted for the mounting of the bearing assembly 16 therein. An outer housing 18 having an inwardly facing surface 20 is spaced radially from the inner housing. A groove 22 in the inwardly facing surface of the outer housing extends circumferentially around the support structure. A plurality of arcuate segments 24 are disposed in end to end relationship between the inner housing and the outer housing. Three segments are illustrated. Each arcuate segment has an outwardly facing recess 26 formed between a pair of end pedestals 28 which project from the segment into abutting contact with the inwardly facing surface of the outer housing. A chamber 30 is formed between each segment in the outer housing. Each arcuate segment has an inwardly facing surface 32 which is spaced apart from the outwardly facing surface of the inner housing by a center pedestal 34. A circumferentially extending chamber 36 is formed between the center pedestals of the adjacent arcuate segments and between the inwardly facing surface of adjacent segments and the outwardly facing surface of the inner housing. The outer housing 18 has at least one inlet conduit 38 through which a fluid medium is flowable into the chambers 30, and a plurality of outlet conduits 40 through which the fluid medium is flowable from the chambers 30. Three outlet conduits are illustrated. As is in FIG. 3, an orifice 42 formed by the groove 22 and the end pedestals 28 communicatively joins the chambers 30. End seals 44, such as piston ring type seals, inhibit the escape of fluid from the chambers 30.

Many modifications to the basic structure may be made within the spirit and scope of the present invention. In one such construction illustrated by FIG. 4, the structure is formed of an inner housing 112 having an outwardly facing surface 114. The inner housing is adapted for the mounting of a bearing assembly 116 therein. An outer housing 118 having an inwardly facing surface 120 is spaced radially from the inner housing. A plurality of arcuate segments 124 are disposed between the inner housing and the outer housing. Each arcuate segment has an outwardly facing recess 126 formed between a pair of end pedestals 128 which project from the segment into abutting contact the inwardly facing surface of the outer housing. A chamber 130 is formed between each segment in the outer housing. Each arcuate segment has an inwardly facing surface 132 which is spaced apart from the outwardly facing surface of the inner housing by a center pedestal 134. A circumferentially extending chamber 136 is formed between the center pedestals of adjacent arcuate segments and between the inwardly facing surface of adjacent segments and the outwardly facing surface of the inner housing. At least one inlet conduit 138 penetrates the outer housing to communicate with each chamber 130. A fluid medium is flowable through each of the conduits 138 to the respective chambers 130. At least one outlet conduit 140 leads from each chamber. The fluid medium is flowable from each chamber through the outlet conduit. A plurality of holes 146 penetrate each arcuate segment to provide fluid communication with the circumferentially extending chambers 136. As illustrated, one hole 146 is provided at each end of each chamber 136. End seals 144, such as the piston ring type seals illustrated, inhibits the leakage of fluid medium from the chambers 130 and 136.

In a rotary machine incorporating the above described bearing support structure, the bearing is centered by the arcuate segments 24. The stiffness of the segments far exceeds the stiffness necessary to support the dead weight of the rotor such that the segments collaterally effect spring damping of the vibratorily excited rotor during operation. The precise stiffness is, of course, dependent upon the installation including such considerations as the machining type and machine size, manufacturing and design tolerances of the rotor, the fundamental natural frequency of the rotor, and the environment in which the machine is to be operated.

During operation of the machine in which the FIG. 1 apparatus is installed, fluid damping is employed simultaneously with spring damping. A fluid medium, such as oil, is flowed through the inlet conduit 38 to one of the chambers 30 and circumferentially through the orifices 42 until all of the chambers are filled. Fluid continues to circulate through the chambers and forced out of the bearing structure through the outlet conduits 40. At least one outlet conduit is provided for each chamber 30. The combined cross sectional area of all the outlet conduits is preferably less than the cross sectional area of the inlet conduit. Should the rotor vibrate during operation, the bearing assembly 16 and the inner housing 12 are displaced orbitally within the outer housing 14. Such orbital motion is received by the arcuate segments 24 in the form of radial displacement causing the radius of curvature of the arcuate segments to vary. Varying the radius of curvature of the segments changes the shape and volume of the chambers 30 formed thereby. Fluid along the walls of the recess 26 and inwardly facing surface 20 is caused to flow circumferentially in the chambers 30. Shearing forces in the fluid along the walls absorb energy from the vibrating shaft. Concomitantly, energy is absorbed by that fluid which is forced from any chamber 30 through the orifices 42 to the adjacent chambers 30. The fluid is heated during the energy absorption process and subsequently circulated out of the bearing structure through the outlet conduits 40. Relatively cool fluid replaces the heated fluid and the energy absorption process continues.

Figure 4:
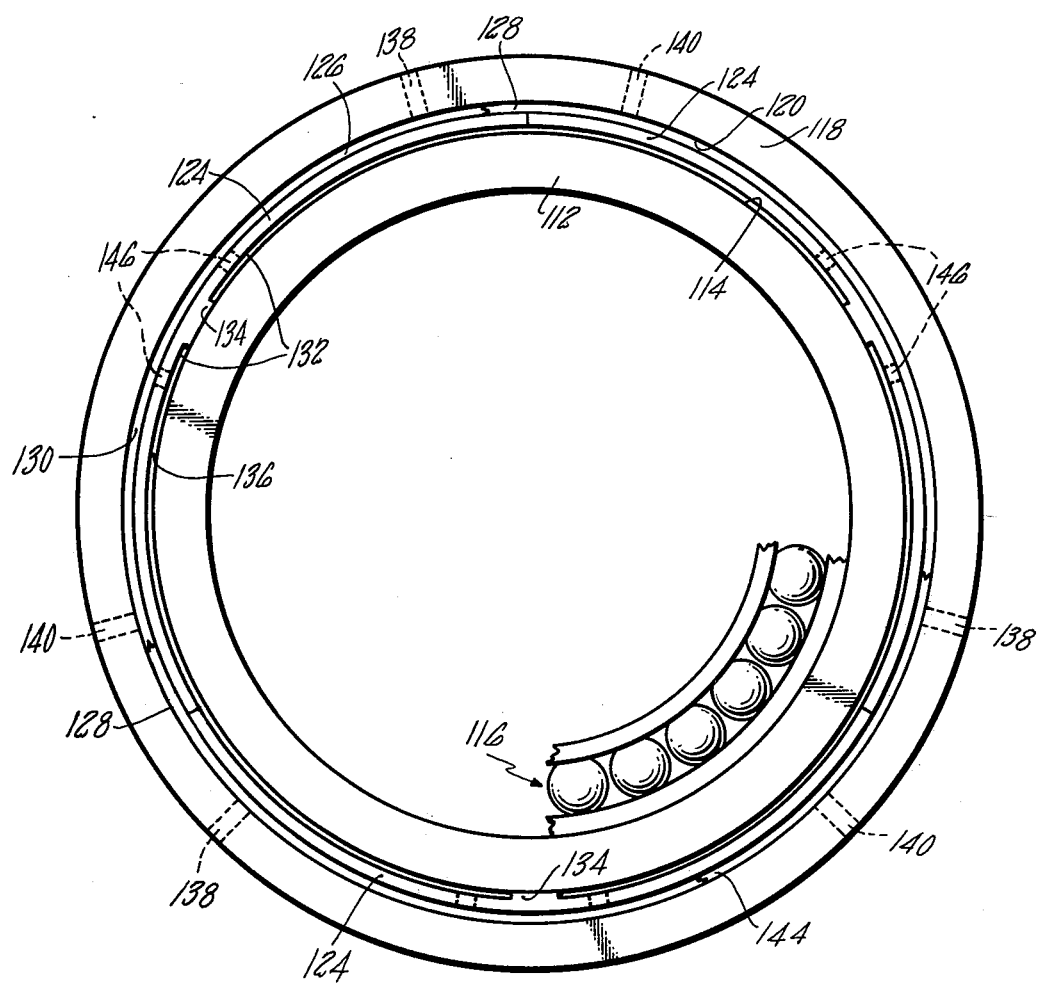
FIG. 4 is a perspective view on alternate bearing support structures including cutaway portions which reveal the contour of the arcuate segments.

A similar absorption process occurs in the FIG. 4 embodiment of the invention. In this embodiment, however, fluid is flowed to the chambers 130, which are comparable to the chambers 30 of FIG. 1, and to the additional chambers 136. During excitation of the rotor, fluid shearing occurs along the walls of the chambers 130 and also along the walls of the chambers 136. The holes 146 provide ingress and egress of fluid to the chambers 136.

In another embodiment of the invention illustrated by FIG. 4, each chamber 130 is provided with an inlet conduit 138 and an outlet conduit 140. Each chamber 130 is not in direct communication with the adjacent chambers 130.

Figure 2:
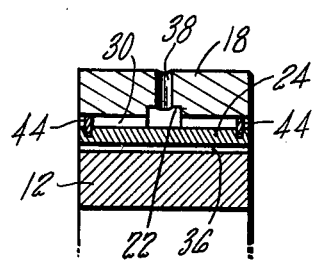
FIG. 2 is a sectional view taken along the line 2—2 of FIG. 1.

As is the case with the stiffness of the segments 24 of FIG. 1 or 130 of FIG. 2, such criteria as machine type and size, the manufacturing and design tolerances of the rotor, fundamental natural frequency of the rotor, and the environment in which the machine is to be operated will dictate the size of the fluid chambers and the size and number of fluid holes and conduits. Such design for any particular machine is in accordance with known procedures and practices, and is not included in the inventive concepts taught herein. In a typical bearing support structure in an aircraft type gas turbine engine, the width of the chambers 130 and 136 is on the order of fifteen thousandths (0.015) of an inch.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. In a bearing support structure of the fluid damping type, the improvement comprising:
   an inner housing which is adapted to receive a bearing to be supported;
   a plurality of arcuate segments extending circumferentially in abutting end to end relationship about said inner housing, wherein each end of each segment has an outwardly extending pedestal and wherein each of said segments has an inwardly extending pedestal spacing said segment apart from the inner housing;
   an outer housing which has an inwardly facing surface abutting the outwardly extending pedestals of each arcuate segment to form a chamber for fluid damping medium between the pedestals, and which has at least one inlet conduit for supplying fluid damping medium to the chambers and at least one outlet conduit at each chamber for allowing the discharge of fluid damping medium from that chamber, wherein the sum of the cross sectional areas of the outlet conduits is less than the total inlet conduit, cross sectional area;
   and a pair of axially spaced end seals extending between said outer housing and said arcuate segments to inhibit the leakage of damping medium axially from the chambers.

2. The invention according to claim 1 wherein chambers contiguous with the inner housing for fluid damping medium are formed between the inwardly extending pedestals of adjacent segments.

3. The invention according to claim 2 wherein damping fluid is flowable to each of the chambers between inwardly extending pedestals through at least one hole in one of the arcuate segments.

4. The invention according to claim 3 wherein each arcuate segment has a pair of said holes, one on each side of the inwardly extending pedestal, for flowing a fluid medium to the chambers inwardly of said segment.

5. The invention according to claim 1 wherein the inwardly facing surface of the outer housing has a circumferentially extending groove formed therein to communicatively join each pair of adjacent chambers.

* * * * *